United States Patent
Yasseen

(10) Patent No.: US 12,108,911 B2
(45) Date of Patent: Oct. 8, 2024

(54) FOLDABLE GRILL

(71) Applicant: Wael Yasseen, Arraba (IL)

(72) Inventor: Wael Yasseen, Arraba (IL)

(*) Notice: Subject to any disclaimer, the term of this patent is extended or adjusted under 35 U.S.C. 154(b) by 1017 days.

(21) Appl. No.: 16/965,044

(22) PCT Filed: Jan. 24, 2019

(86) PCT No.: PCT/IB2019/050608
§ 371 (c)(1),
(2) Date: Jul. 27, 2020

(87) PCT Pub. No.: WO2019/145898
PCT Pub. Date: Aug. 1, 2019

(65) Prior Publication Data
US 2020/0345178 A1  Nov. 5, 2020

Related U.S. Application Data

(60) Provisional application No. 62/621,608, filed on Jan. 25, 2018.

(51) Int. Cl.
*A47J 37/07* (2006.01)
*A47J 36/34* (2006.01)

(52) U.S. Cl.
CPC ........... *A47J 37/0763* (2013.01); *A47J 36/34* (2013.01); *A47J 37/0704* (2013.01); *A47J 37/0786* (2013.01); *A47J 2037/0777* (2013.01)

(58) Field of Classification Search
CPC ................. A47J 2037/0777; A47J 36/34; A47J 37/0704; A47J 37/0763; A47J 37/0786
See application file for complete search history.

(56) References Cited

U.S. PATENT DOCUMENTS

| 11,534,027 B2* | 12/2022 | Reales Bertomeo ........................ A47J 37/0704 |
| 2004/0154603 A1* | 8/2004 | Crawford .............. A47J 37/079 126/25 B |
| 2017/0340167 A1* | 11/2017 | Chung ................. A47J 37/0704 |
| 2018/0368614 A1* | 12/2018 | Rudy ................... A47J 37/0786 |

FOREIGN PATENT DOCUMENTS

| JP | 2006223342 A | * | 8/2006 |
| JP | 2010002177 A | * | 1/2010 |

OTHER PUBLICATIONS

Machine translation of JP-2006223342: Toyama, In the Stove, 2006 (Year: 2006).*
Machine translation of JP-2010002177: Takanama, Barbecue Stove, 2010 (Year: 2010).*

* cited by examiner

*Primary Examiner* — Janie M Loeppke
*Assistant Examiner* — Abigail H Rhue
(74) *Attorney, Agent, or Firm* — Rivka Friedman

(57) ABSTRACT

A foldable grill for housing a charcoal fire, the foldable grill including: (a) a body, the body having at least partially an empty internal volume; (b) a first grill portion and a second grill portion, the first and second grill portions being hingedly coupled together and in slidable communication with the body, the foldable grill adapted to be movable between an open configuration and a closed configuration, wherein in the closed configuration, the first and second grill portions are disposed within the empty internal volume.

16 Claims, 6 Drawing Sheets

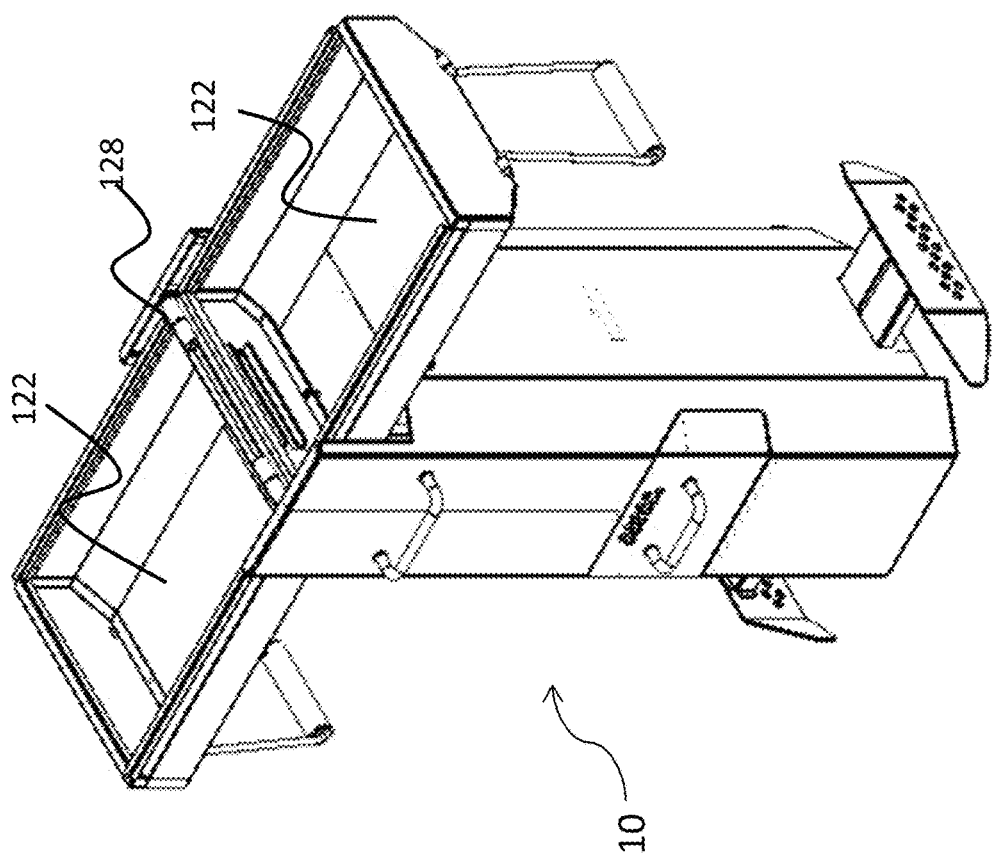
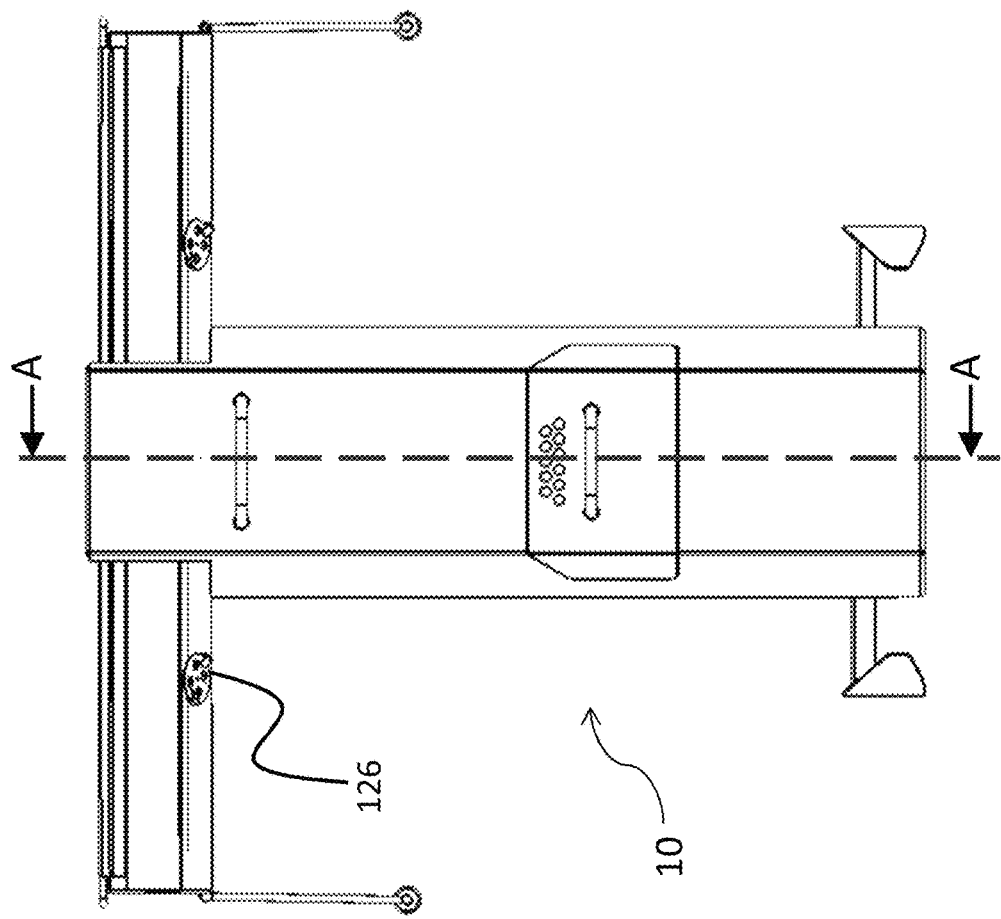

FIG. 1F  SECTION A-A

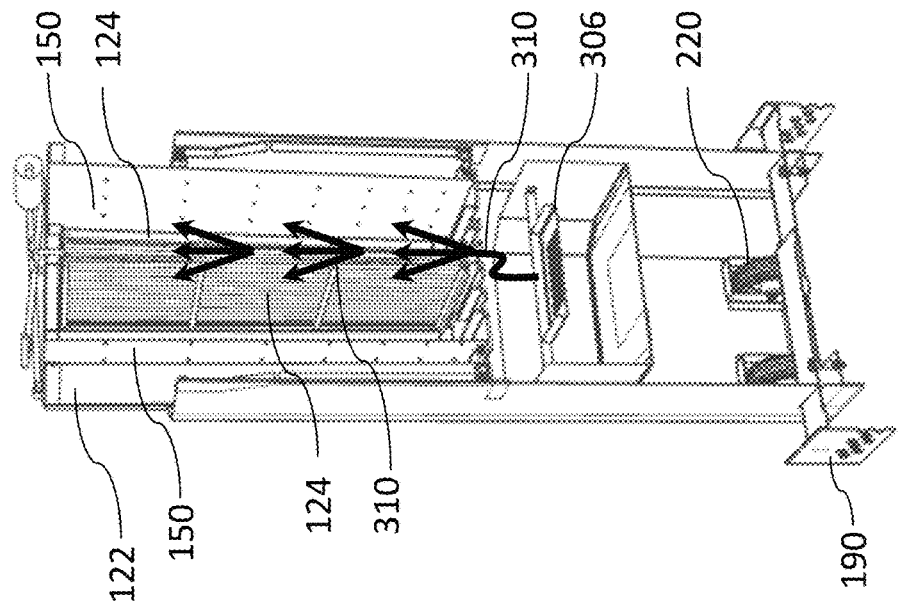
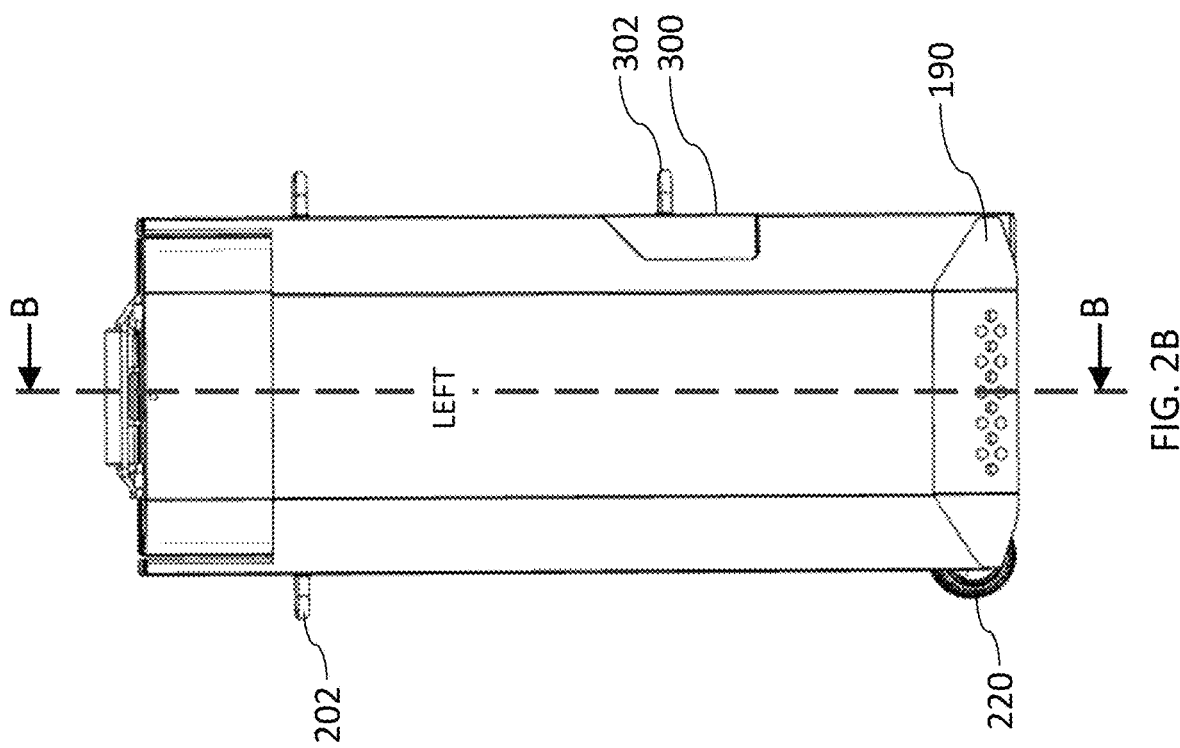

FOLDABLE GRILL

FIELD OF THE INVENTION

The present invention relates to a barbeque grill and, more particularly, to a foldable grill which folds into a vertical pillar, looks neat, takes up minimal space and is easily storable.

BACKGROUND OF THE INVENTION

Having a barbeque is a great way to spend a Sunday afternoon or occasional holiday, however, for the rest of the days, weeks and sometimes months between uses, the grill sits on the porch, taking up space, looking like an eyesore, annoying the wife and rusting in the rain.

Furthermore, charcoal grills are universally agreed to produce a more flavorful cooking product, however, the effort, time and skill needed in preparing a charcoal grill makes this option unappealing. For a charcoal grill, it is necessary to handle the dirty briquettes of charcoal. These need to be arranged with newspapers and such to get the fire burning. The charcoal or briquettes need to burn until they are covered with white-gray ash. The coals will need to burn anywhere between 15 and 35 minutes, depending on the method and/or additional apparatuses used (such as a chimney starter).

SUMMARY OF THE INVENTION

The present invention successfully addresses the shortcomings of the presently known configurations by providing a grill that is foldable, elegant and easily stored. The coals can be quickly prepared for grilling in the closed/folded state. Furthermore, the grill is designed to improve airflow through the unit to ensure efficient and even heating while grilling thereby reducing hot spots so that the food is heated consistently throughout.

According to the present invention there is provided a foldable grill for housing a charcoal fire, the foldable grill including: (a) a body, the body having at least partially an empty internal volume; (b) a first grill portion and a second grill portion, the first and second grill portions being hingedly coupled together and in slidable communication with the body, the foldable grill adapted to be movable between an open configuration and a closed configuration, wherein in the closed configuration, the first and second grill portions are disposed within the empty internal volume.

According to further features in preferred embodiments of the invention described below the first and second grill portions are hingedly coupled together by a butterfly-leaf opening and closing mechanism for converting the foldable grill from the open configuration to the closed configuration.

According to still further features in the described preferred embodiments in the open configuration, the first and second grill portions are in a horizontal orientation and in the closed configuration the first and second grill portions are in a substantially vertical orientation.

According to further features in the open configuration the first and second grill portions are positioned on top of upper edges of at least some side walls of the body. According to further features the first and second grill portions are in slideable communication with the body via a guide system. According to further features the guide system includes two elongated Y-shaped channels attached to internal faces of the body, one on each side of the body. According to further features each of the Y-shaped channel has two wheels attached to upper edges of separated prongs of the Y-shaped channel, adapted such that when moving from the open configuration to the closed configuration, the first and second grill portions roll over the wheels.

According to further features each of the grill portions further includes a bushing affixed to an underside of the grill portion. According to further features when the first and second grill portions are moved into the closed configuration, each of the bushings slots into, and runs within, a respective the Y-shaped channel.

According to further features the foldable grill further includes a pair of wheels attached at the base of a back wall of the body.

According to further features the foldable grill further includes a pair of supports disposed on either side of the body, near a base of the body, parallel to the grill portions in the open configuration. According to further features the pair of supports are non-extendable. According to further features the pair of supports are reversibly extendable.

According to further features each of the first and second grill portions includes: (i) a compartment adapted to hold solid fuel; and (ii) a grate adapted for use as a grilling surface.

According to further features the compartment includes a plurality of ventilation ports, vents or slots, disposed in a lower part of at least one sidewall of the compartment. According to further features one or more of the ventilation ports, vents or slots are adapted to be uncovered, partially covered and completely uncovered.

According to further features each of the gill portions further includes: (iii) a grill net, the grill net being disposed between the grate and a bottom internal surface of the compartment and having a solid planar shape with ventilation holes formed therein, adapted such that ash filters down from the combustible fuel above the grill net to below the grill net and air passes through from below the grill net to the combustible fuel above the grill net.

According to further features each of the gill portions further includes: (iv) a heating efficiency partition, the heating efficiency partition is a thin partition having a same size and shape as the grid net and disposed between the grid net and a bottom surface of the compartment, the heating efficiency partition adapted to be in place only when in the closed configuration.

According to further features the foldable grill further includes: (c) a drawer, the drawer being removable inserted in a front wall of the body, and disposed below the empty internal volume of the body, the drawer adapted to receive ash falling from openings in foot ends of the grill portions, when in the closed configuration.

According to further features the drawer includes a drawer grate disposed within the drawer, and the drawer grate adapted to receive ignition material, wherein burning the ignition material in the closed configurations results in a chimney effect.

BRIEF DESCRIPTION OF THE DRAWINGS

Various embodiments are herein described, by way of example only, with reference to the accompanying drawings, wherein:

FIG. 1A is a front view of the foldable grill in the open state;

FIG. 1B is an elevated isometric view of the foldable grill 10, without the grates;

FIG. 1F is a cross sectional view A-A of FIG. 1A;

FIG. 2B is a side view of the foldable grill 10 in the closed state;

FIG. 2C is a cross-sectional view of Section B-B of FIG. 2B.

DESCRIPTION OF THE PREFERRED EMBODIMENTS

Figure 2:
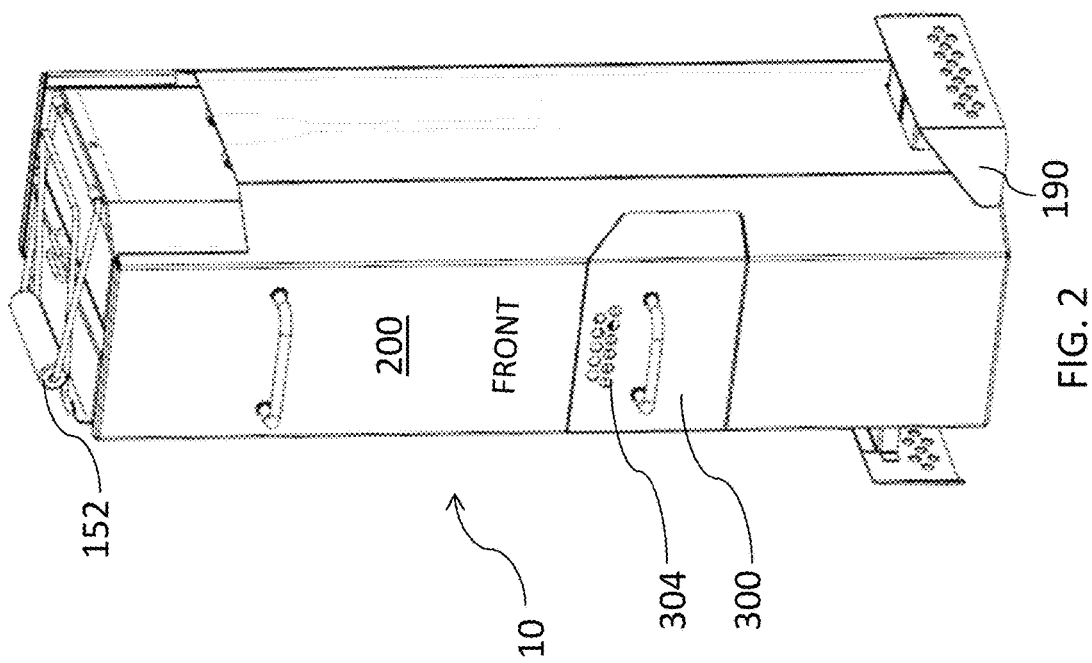
FIG. 2 is a front isometric view of the foldable grill 10 in a closed state.

There is a disclosed herein a foldable grill. The foldable grill is a single unit comprised of many parts, some moveable and some stationary. The grill has two basic parts, each made up of various components. One part is a grilling area and the various components thereof. The other part is a body and the various components thereof. In one embodiment, the parts are attached together and cannot be separated without disassembly. In another embodiment, the parts are configured to be used in conjunction, but may be separated without the use of tools and/or skilled disassembly. In both of the aforementioned embodiments, the two parts are configured for use in conjunction with each other.

It is made clear that any structural or functional description that is provided for one embodiment of the invention is intended to apply to all the other embodiments, as if fully described for each embodiment. Only if a given functional or structural feature is incompatible with one or more alternative configurations, it is clear that the incompatible feature is not considered part of the embodiment with which is it incompatible.

The grilling part is comprised of two "wings" or "leaves", referred to generally as grilling portions, are hingedly coupled together. The terms "wings", "leaves" and "grilling portions", as well as variations thereof, are all used interchangeably herein. The hinge allows the wings/leaves to either fold together in a vertical orientation or lie open, in a flat, planar manner, in a horizontal orientation. Such a hinge is sometimes referred to as a "butterfly hinge" or "butterfly mechanism".

The body part is in the shape of a stand or pillar. The body includes an internal space or volume which is at least partially empty, a drawer and portion for supporting and stabilizing the body on the ground (e.g. wheels, extendable support legs). Besides for the drawer and various connecting pieces discussed elsewhere, the body is generally hollow which allows for excellent ventilation, and a chimney effect.

The foldable grill has two states. One state is a closed state. The other state is an open state. In the closed state the grilling portions are in a folded configuration, whereby the leaves are folded together (like the leaves of a book), and disposed inside the body part, inside the empty internal area. Said another way, in the folded configuration, the grilling portions, or wings, are folded like the wings of the butterfly, pressed together in a vertical orientation, and inserted into the empty internal space of the body.

In the open state the grilling portions are laid open, side by side, to form a long continuous surface (the grilling surface), in what is referred hereafter to as an open configuration. The term "laid-open configuration" is used interchangeably with the term "open configuration". In the open configuration/state, the foldable grill (or at least the grilling part of the foldable grill) has the same general appearance as a normal grill.

To prevent confusion, it is hereby made clear that the terms "folded state", "closed state", "folded configuration" and "closed configuration" (as well as variations thereof) are used interchangeably herein. The closed state inherently means that the grilling portions are in the folded configuration. The term "folded state" likewise refers to the closed state and folded configuration. Similarly, the terms "open state", "open configuration" and "laid-open configuration", as well as variations thereof, are used interchangeably herein. Thus the open state confers the meaning of the grilling portions being in the open configuration.

The principles and operation of a foldable grill according to the present invention may be better understood with reference to the drawings and the accompanying description.

Figure 1:
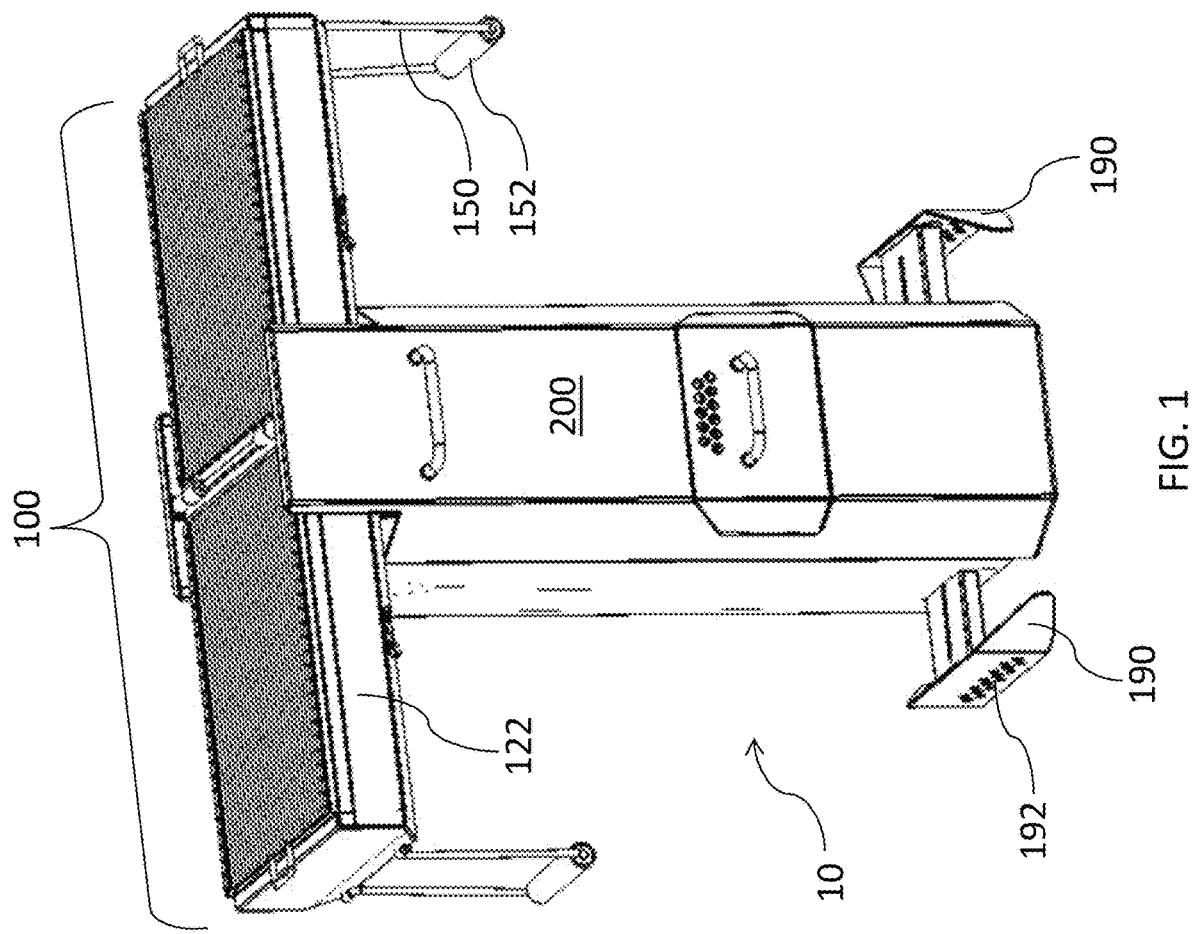
FIG. 1 is a slightly elevated, isometric front view of a foldable grill 10 in an open state.

FIG. 1 illustrates a slightly elevated, isometric front view of a foldable grill 10 in an open state (as described above and hereafter). In the open state, a grilling area 100 is positioned, in a general way, atop a main portion of a body 200 of the foldable grill 10. The grilling area 100 includes a first grill portion 120 and a second grill portion 120, referred to collectively as grill or grilling portions 120. (The ordinal terms "first" and "second", as used here, are arbitrary and convey no precedential intention.) Both grilling portions 120 have the same structure and features and therefore share the same reference number. The grilling portions 120 are hingedly coupled together.

Figure 1C:
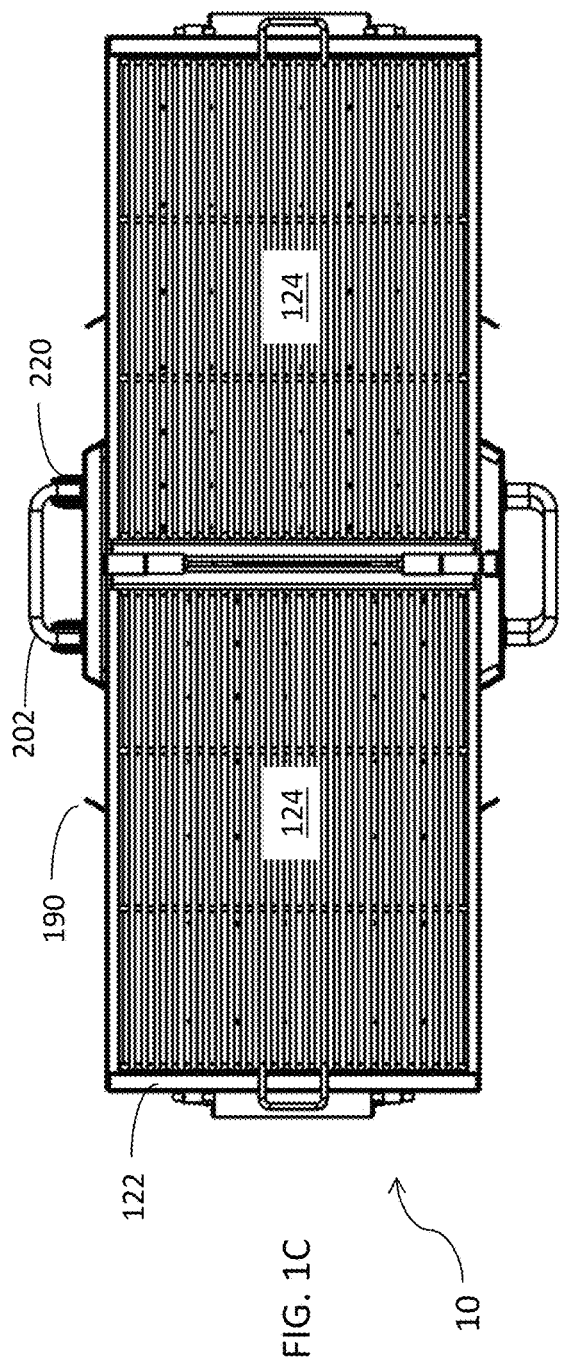
FIG. 1C is a top view of a line drawing of foldable grill 10.
Figure 1D:
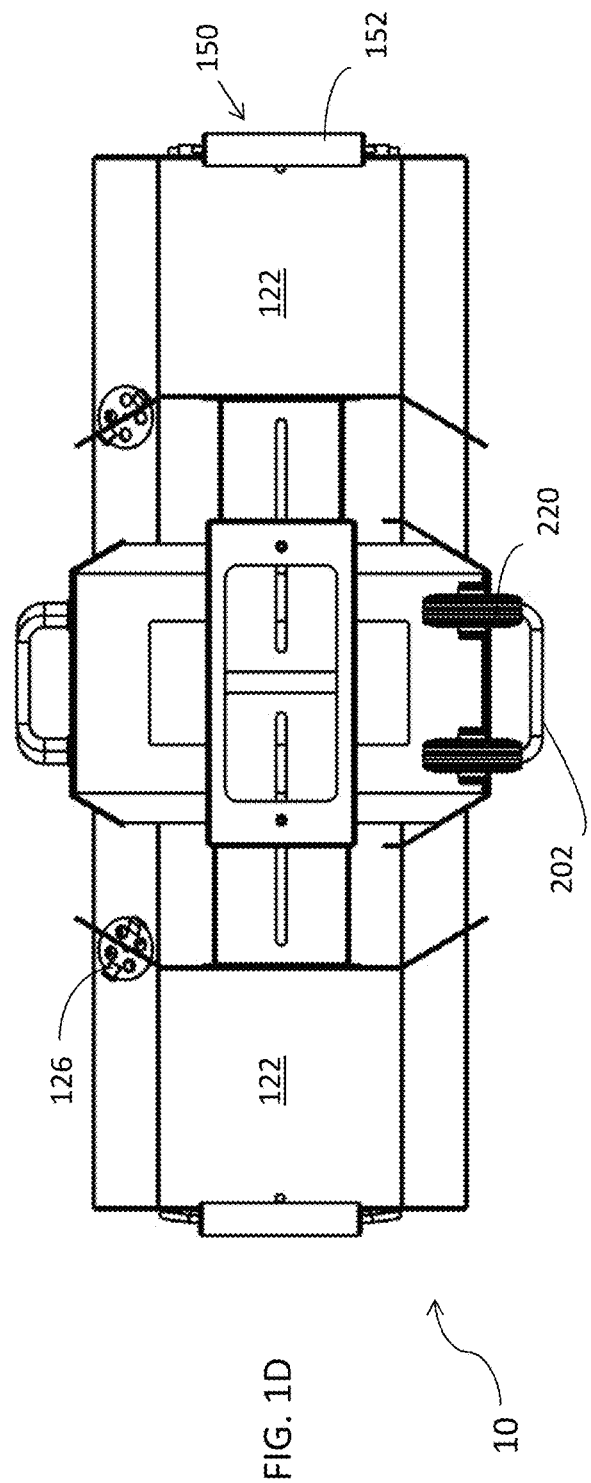
FIG. 1D is a bottom view of a line drawing of foldable grill 10.

FIG. 1A illustrates a front view of the foldable grill in the open state. FIG. 1B illustrates an elevated isometric view of the foldable grill 10, without the grates. FIG. 1C is a top view of a line drawing of foldable grill 10. FIG. 1D is a bottom view of a line drawing of foldable grill 10.

In a first embodiment, each grill portion 120 consists of a basin type compartment 122 which is covered with a grid or grate 124. Grate 124 is a metal frame that is used to cook food over hot coals. The term "grill" could be used synonymously with "grate 124", however, in order to avoid confusion between the use of the same word as a verb and the use of the same word of a noun with reference to the entire apparatus, the term "grate" is used when referring to the wire cover of the compartment 122.

The basin-like compartment 122 is adapted for receiving fuel for the fire. The fuel may be any type of solid combustible material. Common examples of solid fuels include wood, charcoal, peat, coal, Hexamine fuel tablets, wood pellets, corn, wheat, rye, and other grains. For the sake of convenience and clarity, the term "combustible material" (and variations thereof) is used interchangeably herein with any one of the combustible materials listed heretofore. Therefore, the use of one term, such as "coal" is not intended to be limiting in any way, and refers equally to any other applicable type of combustible material.

In order for the fire to burn effectively, it is necessary to provide adequate ventilation to the combustible material. To that end, ventilation ports 126 are formed on the walls of the compartments 122. Preferably, the ventilation ports/vents are disposed on the lower parts of the walls of the compartments 122. As best seen in FIG. 1A and FIG. 1C, ventilation ports 126 are depicted on the beveled panels or wall sections of grill portions 120. The ventilation ports may be on one or more sidewalls of the compartment.

The ventilation ports 126 are depicted in a merely exemplary configuration. The depicted configurations is not intended to be limiting in any way. The depicted configuration is a circular with four ventilation holes. A circular plate with corresponding holes is rotatably affixed to the over the ventilation holes. The user swivels the plate to either cover, partially uncover or completely uncover the ventilations holes, depending on the desired amount of ventilation.

In an alternative configuration, there are a series of ventilation slots disposed along a lower portion of the side wall of the compartment. For example, if adapted to the depicted configuration, the ventilation slots are disposed along the beveled panel or wall section of each compartment 122. The grill portions 120 further contain a slidable panel, disposed within the compartment 122, lying along the beveled wall section of the compartment 122. The slidable panel extends outside the compartment, through an opening in the compartment wall, and terminates in a handle. Preferably the handle is covered with a grip made of a material that does not conduct heat well, e.g. wood or ceramic. By drawing the panel out of the compartment, the ventilation slots are opened. As the panel is drawn further out of the compartment, more slots are opened, starting from the slot closest to the hinge and moving outwards. Where the slots are open, the fire will be hotter due to the increased ventilation.

Referring still to the first embodiment (and to both variations of the ventilation openings equally), in the open state, the grill portions 120 rest on top of the body 200. In the depicted, exemplary configuration of the foldable grill 10, the grill portions 120 rest on upper edges of six of the eight sides of the body. The remaining two sides of the body are higher than the other six and sandwich the grill portions between them, at the hinged edge between the two grill portions.

For further clarification, in the open state/configuration, the grilling portions 120 lie across at least a large portion of the upper edges of the top, open end, of the sides of the body 200. The terms "top" of the of the body and "upper" edges of the sides of the body refer to the open end (also referred to herein as top opening, mouth and variations thereof) of the body 200 that is located opposite the base or bottom end of the body which stands on, or proximal to, the ground or other floor surface.

To additionally aid in describing the folding grill, the terminology with which each of the sides of the grilling portions is described hereafter. Each grill portion 120 has a top, bottom, head-end, foot-end, front side and back side. The top of the grill portion is where the grate 124 is placed. The bottom of the grill portion is the lower surface of the compartment 122. The head-end of the compartment is the side-wall of the compartment to which the handle is connected. The foot-end of the compartment is the side-wall of the compartment to which the hinges are attached. The front side of the compartment is the side-wall of the compartment on the same side of the drawer and drawer handle. The back side of the compartment 122 is the side-wall of the compartment on the same face as the wheels of the body.

In the open configuration, the grill portions are orientated horizontally, with the grate facing upwards towards the sky or ceiling. In the open state, the two grill portions 120 (or wings 120) are laid-out horizontally, foot-end to foot-end hingedly coupled together, on top of body 200. In the open state the grill portions 120 form a planar, horizontally orientated, grilling surface 100.

In the open state, the body serves as a pillar or stand for the grilling surface. In addition, the mainly hollow interior of the body 200 provides excellent ventilation to the coals in the compartments 122. Air is drawn into the interior of the body through ventilation holes and other gaps. For example, at least some of the bottom edges of the body sides are not configured to be flat against the ground but rather slightly raised, leaving a ventilation gap.

An optional but preferred feature is depicted in the Figures. The body further includes a pair of supports 190 disposed on either side of the body 200, near the base or bottom end of the body 200. The supports stabilizes the body on the surface, especially in the open state when the grill portions are extracted. In some embodiments, the supports 190 slide closed and open. In the Figures, the supports are depicted in the open, extended position (even in the figures that depict the foldable grill in the closed state). The supports 190 extend outwards, parallel to the grill portions 120, n the open configuration. The supports stabilize the grill, especially when the wings are extracted from the body of the grill and unfolded in the open position. The term "stabilizers" is used interchangeably with the term "supports 190".

In the open state, the supports prevent the grill from tipping over to one of the sides. The supports 190 have ventilation holes 192 as part of the ventilation system so that even when the supports retracted in the closed state, there is airflow through the system. Air flow is crucial when initially igniting the coals in the closed state (discussed in further detail below). The ventilation holes also prevent the buildup of bad smells and bacteria growth when the grill is closed and/or in storage. It is made clear that the first embodiment includes one variation whereby the body 200 does not include supports 190; another variation whereby the body includes fixed, non-extendable supports 190 (i.e. not extendable or retractable); and another variation whereby the body includes reversibly extendable 190 attached to the bottom end of the body, whereby the supports rest on the ground or floor surface.

Figure 1E:
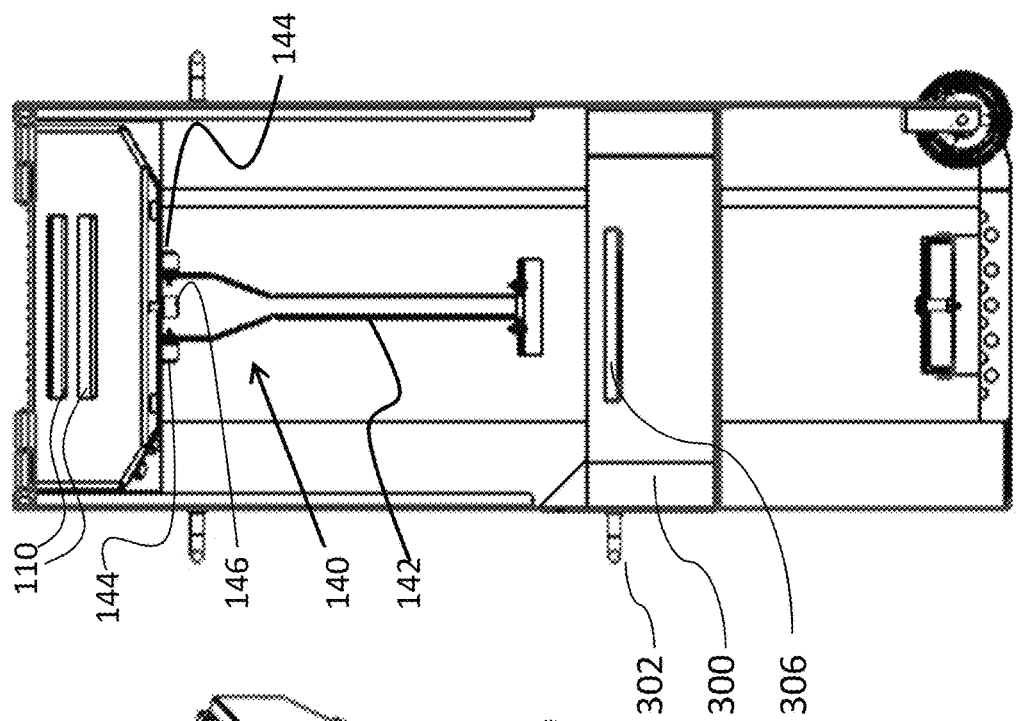
FIG. 1E is an elevated isometric view of the foldable grill 10 with the front and side walls of body 200 disappeared.
Figure 1E:
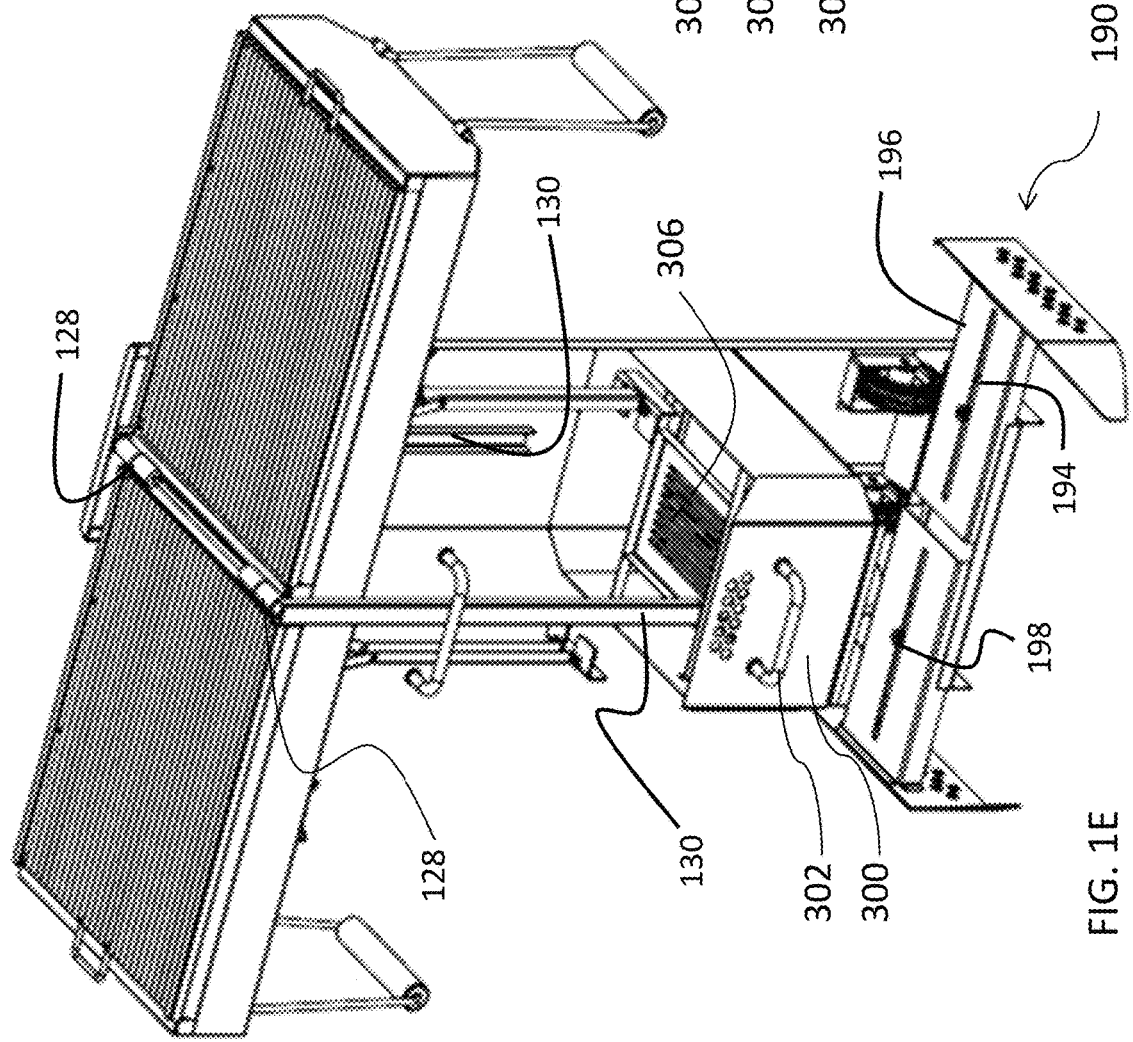

FIG. 1E illustrates an elevated isometric view of the foldable grill 10 with the front and side walls of body 200 disappeared. According to the latter variation described heretofore, each of the supports 190 has a slit 194 through the middle of the horizontal piece 196 of the support. The support is connected to a base plate via a pin 198 which also allows the support to slide in and out, into the extended and retracted positions.

One of the important features of the foldable grill is a hinged coupling mechanism including hinges 128. Hinges 128 rotatably connect wings 120 together. The hinges provide the foldable grill with a butterfly leaf closing/opening mechanism as detailed elsewhere herein. The grill portions move from the open configuration to the folded configuration by rotating the grill portions towards each other on the hinges 128.

The external edges of hinges 128 are nestled in guide channels 130. Guide channels 130 run along the middle of the interior faces of the front and back walls of the body 200 When the wings are folded together (each wing moving 90 degrees in an arc towards the other wing, thereby moving from a horizontal orientation in the open configuration to a vertical orientation in the folded configuration), the vertically orientated wings slide down into the empty internal volume of body 200, guided by channels 130.

FIG. 1F is a cross sectional view A-A of FIG. 1A. A second guide channel system 140 is visible in the figure. The first and second grill portions are in slideably with the body via a guide system 140. The guide system 140 includes two elongated Y-shaped channels 142 attached to internal faces of the body, one on each side of the body. Each Y-shaped channel has two wheels 144 attached to the upper edges of the separated prongs of the Y. When moving from the open state to the closed state, the bottom of compartment 122 rolls over wheels 144. A bushing 146 is affixed to the underside of the wing 120, near the foot-end. When the grill portions are moved into the vertical orientation, the bushing 146 slots into the channel 142. When the wings are lowered into the empty internal space of body 200 or raised from within the body, the bushings 146 (one on each grill portion) run within the channels 142 until the wings are opened into the horizontal orientation (open configuration).

FIG. 2 illustrates a front isometric view of the foldable grill 10 in a closed state. Still referring to the first embodiment of the invention, in the closed state, the grilling area 100 is in the folded configuration and disposed inside the empty volume of body 200. Body 200 is generally an empty shell which serves as a storage compartment when in the closed state and as a stand when in the open state. The body has other functions in the closed state, which is discussed in further detail below.

The body has an elongated shape which is intended to be in a vertical orientation both during use and when in the closed state. The elongated body depicted in the Figures has a cross-section of an 8-sided, irregular, convex polygon. It is made clear that the instantly depicted configuration of the body is merely exemplary, and any other applicable shape of the cross-section is considered to be within the scope of the invention as described herein and defined in the claims. For example, the elongated body may have a circular cross-section, a rectangular cross-section, a square cross-section, an oval cross-section and indeed any applicable shape or configuration.

Body 200 has, at least partially, an empty internal volume. In the closed state the grill portions 120 are inserted into the empty internal space.

The sides of the bodies are named hereafter, for increased clarity. The front panel is the side of the body which includes the drawer. The back panel of the body is the same side of the body where the wheels are. The right side is the side on the right when viewing the front panel.

As mentioned, in the folded state, the grill portions 120 are folded substantially parallel to each other (with the grates facing each other) and inserted into the empty internal space of the body. According to the first embodiment, the grill portions are stored inside the body in the closed state and removed from the inside of the body in the open state.

When moving from the closed state to the open state, the first step is to grasp swing handles 150, which are attached to the head-ends of the grill portions 120, and pull upwards, away from body 200. For convenience, the grill may be tilted onto wheels 160, thereby providing the user with a more convenient angle for extracting the wings from inside the hollow body 200. In variations, the body does not include wheels. Next, the wings 120 are extracted fully (or almost fully) and then separated left and right until the wings lie perpendicular to the body 200 is detailed elsewhere herein. Preferably, handles 150 have grips 152 made from insular materials such as wood or ceramic and the like. The swing handles 150 can double as hanging racks for barbeque tools and accessories (e.g. tongs, hand cloth, etc.).

According to a second embodiment, all the components described in the first embodiment are included in the second embodiment. In addition, the second embodiment of the invention includes a drawer 300. The drawer is removable inserted in the front wall of the body 200. The drawer fits below the empty internal portion of the body. Drawer 300 has a handle 302 for opening and closing (removing and replacing) the drawer. The drawer further includes ventilation holes 304 which form part of the ventilation system that draws oxygen up the hollow shaft of the body to the coals in the compartments.

The drawer 300 functions, inter alia, as an ignition drawer in the closed state. In the open state, coals are loaded into the compartment 122 space of the grill portions 120, and locked in with the grate. It is preferable to fill the compartment completely for the best results. The loaded grill compartments are then folded into the closed state. Ignition fuel is laid out on a drawer grate 306 (see at least FIGS. 1E, 1F), affixed internally to the drawer. The ignition fuel may be paper towels soaked with cooking oil or lighter fuel, dry twigs and leaves, coals impregnated with lighter fluid, hexamine fuel tablets and the like. Once ignited, the drawer 300 is closed and the flames and heat rise up and ignite the coals, by the chimney effect (also call the 'stack effect'). The ventilation holes 304 (as well as holes 192 of the support 190) provide the necessary openings for drawing in oxygen sustaining the flame and heat. The chimney effect, whereby the small flames emanating from the ignition fuel on the drawer grate 306 extend through the chimney-shaped funnel made by the grill portions 120 and the coals loaded therein, is indicated by arrows 310 in FIG. 2C.

The chimney effect heats the coals very quickly and efficiently, substantially reducing the start-up time of the barbeque. For example, a best case scenario is an initial ignition time of 5-7 minutes, utilizing the chimney effect to quickly bring the coals to the desired temperature. According to other estimates, initial heating time can be between 10-15. Whatever the case, the instant foldable grill can be prepared quicker and more efficiently.

The drawer 300 has an additional function. Once the coals have burned down into ash, the ash collects at the bottom of compartments 122, in the open state. When the grill portions are folded into the closed state, the ash pours out through openings 110 which are disposed on the foot-end side walls of the compartments 120. In the folder configuration, the openings are at the bottom of the compartments and the ash falls into drawer 300. The drawer 300 comes completely out of the body 200 and from there the ask can be removed to the garbage. Any remaining, partially used, coals are stored in the wings and can be re-used for the next barbeque. No mess, no fuss. Easy to clean and reuses fuel instead of discarding the partially used coals.

An envisioned accessory for the foldable grill is a pre-packaged cartridge of coals. The cartridge is the same size and shape as the compartments and fits therein. The user purchases two cartridges, one for each grill portion, and inserts the cartridges in place. The grill is folded into the closed state. The grill can remain in this state until needed, or used immediately. Either way, when ready for use, ignition fuel is loaded into the drawer 300 and ignited. The chimney effect ignites the combustible packaging (which is designed so as to be ignited without opening the packaging and removing the coals), and very quickly bring the coals to the desired readiness for grilling. The cartridge can include a set of matches and/or an especially flammable area, which improves the results of the chimney effect. The use of the accessory further simplifies the fire making process and saves the user from getting unnecessarily dirty, but obviating the need to handle the coals directly. The cartridge is sealed and clean, leaving no significant dirt or coal smears on the user's hands.

Figure 2A:
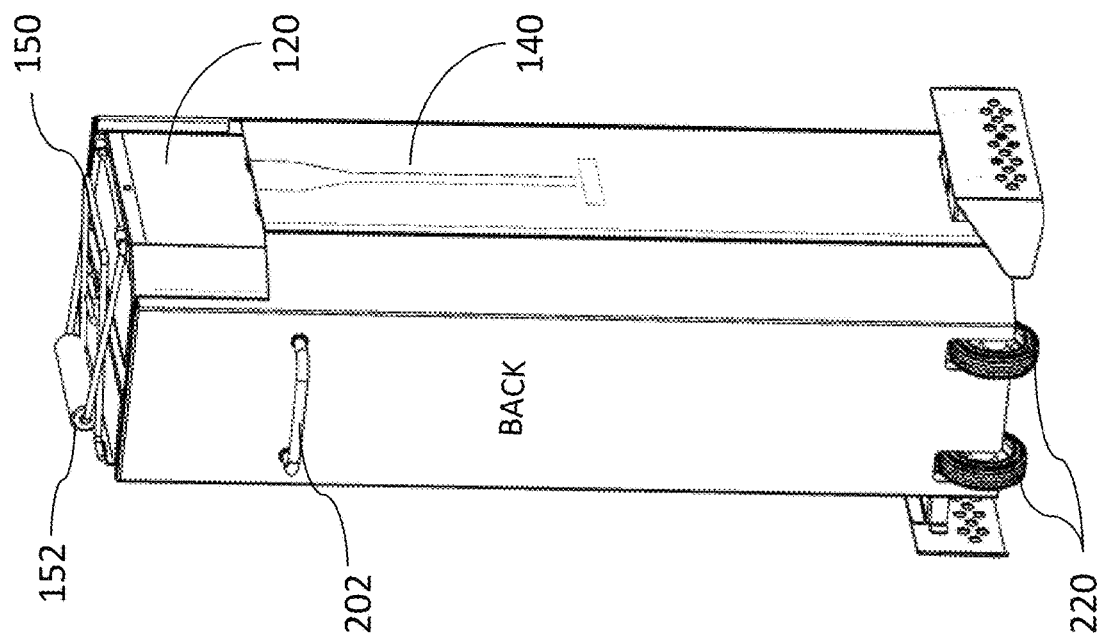
FIG. 2A is a back isometric view of foldable grill 10, in the closed state.

An additional optional feature is a pair of wheels 220 attached said body at the base of the body 200, at the bottom of the back wall of the body. FIG. 2A is a back isometric view of foldable grill 10, in the closed state. Wheels 220 are visible from this angle. The grill can be tilted back to rest on wheels 220 and wheeled around like a dolly (hand truck). The grill can be wheeled around by holding a back handle 202.

Figure 1G:
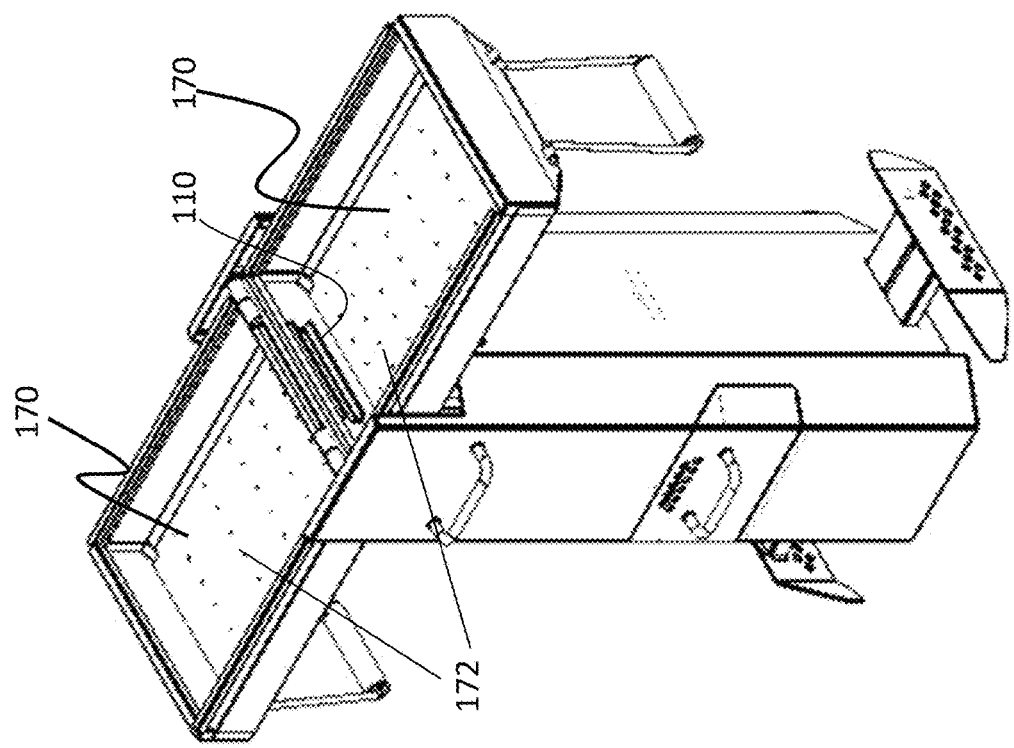
FIG. 1G is an elevated isometric front view of the foldable grill 10 in the open state, according to a third embodiment.

Another possible configuration and embodiment is shown in FIG. 1G. FIG. 1G is an elevated isometric front view of the foldable grill 10 in the open state, according to a third embodiment. The third embodiment is also be considered a variation of the first and/or second embodiments. Likewise the second embodiment is also considered a variation of the first embodiment.

The third embodiment or variation includes all of the structural features of the first two embodiments and all of their variations, mutatis mutandis. In addition to all of the aforementioned features, in the instant embodiment, each grill portion 120 further includes a grill net 170, disposed between the grate 124 and the bottom of the compartment 122. The grill net having a solid planar shape with ventilation holes 172 formed therein. The grill net divides the compartment 122 height-wise into two sub-compartments, the top sub-compartment for coals and the bottom sub compartment for ash. The ventilation holes 172 have a double purpose. On the one hand, ventilation holes allow the ash to filter through to the bottom sub-compartment. On the other hand, in the opposite direction, air coming in from the various ventilation ports pass through the ventilation holes to the coals. The filter holes evenly spread the air coming in through the ventilation ports and other openings (e.g. ash openings 110). The ventilation holes 172 are spaced closer together towards the central hinged area of the grill. The higher concentration of filter holes makes the area hotter (as more air filters through the holes) while the lower concentration of holes (on the ends of the wings) provide a cooler area. The user can therefore arrange the food according to heating needs, food needing more heat near the middle and food needing less heat towards the outer ends.

The ash from the coal falls through the grill net and collects at the bottom of the compartment 122. As mentioned above, the ash that collected on the bottom of the coal compartment of the wings falls through openings 110 which are at the foot-end and open downwards when the wings are in the vertical orientation. FIG. 2B is a side view of the foldable grill 10 in the closed state. FIG. 2C is a cross-sectional view of Section B-B of FIG. 2B.

Another additional, optional feature (not shown) is a heating efficiency partition. The heating efficiency partition is a thin panel or partition the same size and shape as the grid net 170. The heating efficiency partition is disposed between the grid net 170 and the bottom surface of compartment 122. The heating efficiency partition is only put in place when in the closed state, during the initial ignition phase, when applying the chimney effect. Two heating efficiency partitions, one for each grill portion 120, make the chimney area smaller, thereby increasing the heat and burning efficiency when the ignition fuels are burned in the drawer 300. Once in the open configuration, the efficiency heating partition is removed so that air can filter through to the coals and ash can fall into the bottom sub-compartment. The chimney effect, whereby the small flames emanating from the ignition fuel on the drawer grate 306 extend through the chimney-shaped funnel made by the grill portions 120 and the coals loaded therein, is indicated by arrows 310 in FIG. 2C.

Another optional feature is smoke exhaust funnel or tent for centralizing the smoke from the grill. One option is telescopic aerial-like members that are extended from within the body 200 and/or the grill portions 120. The aerial members are extended into position and the regular, single-use, tinfoil is unrolled onto the formation of aerial members. The formation leaves a central portion above the grilling surface open for all the smoke to disperse from. Optionally, handlebars can be attached to the sides of the grill portions, for placing the tinfoil rolls on the handlebars. Another option may be regular, non-telescopic aerial members. Another option may be a chimney accessory sold together with the foldable grill. The accessory is a material that can be used in place of the tinfoil rolls.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A foldable grill for housing a charcoal fire, the foldable grill comprising:
    (a) a body, said body having at least four side walls which define at least partially an empty internal volume;
    (b) a first grill portion and a second grill portion, said first and second grill portions each including a compartment which is covered with a cooking grate and are hingedly coupled together and in slidable communication with said body, the foldable grill adapted to be movable between an open configuration and a closed configuration,
    wherein the body is adapted to support the first and second grill portions in said open configuration, said grates of said first and second grill portions define a horizontal surface and the compartments rest on top of upper edges of at least some of said side walls of said body;
    wherein the body is adapted to store said first and second grill portions in said closed configuration, said first and second grill portions are in a vertical orientation are adapted to be lowered into said empty internal volume; and
    (c) a drawer, said drawer being removable inserted in a front wall of said body, and disposed below said empty internal volume of said body, said drawer adapted to receive ash falling from openings in foot ends of said grill portions, when in said closed configuration, and wherein said drawer includes a drawer grate disposed within said drawer, and said drawer grate adapted to receive ignition material, wherein burning said ignition material in said closed configuration results in a chimney effect due to said side walls of said body.

2. The foldable grill of claim 1, wherein said first and second grill portions are hingedly coupled together by a butterfly-leaf opening and closing mechanism for converting the foldable grill from said open configuration to said closed configuration.

3. The foldable grill of claim 1, wherein said first and second grill portions are in slideable communication with the body via a guide system.

4. The foldable grill of claim 3, wherein said guide system includes two elongated Y-shaped channels attached to internal faces of said body, one on each side of said body.

5. The foldable grill of claim 4, wherein each said Y-shaped channel has two wheels attached to upper edges of separated prongs of said Y-shaped channel, adapted such that when moving from said open configuration to said closed configuration, said first and second grill portions roll over said wheels.

6. The foldable grill of claim 4, wherein each of said grill portions further includes a bushing affixed to an underside of said grill portion.

7. The foldable grill of claim 6, wherein when said first and second grill portions are moved into said closed configuration, each said bushing, of each of said grill portions, slots into, and runs within, a respective said Y-shaped channel.

8. The foldable grill of claim 1, further comprising a pair of wheels attached at the base of a back wall of said body.

9. The foldable grill of claim 1, further comprising a pair of supports disposed on either side of said body, near a base of said body, parallel to said grill portions in said open configuration.

10. The foldable grill of claim 9, wherein said pair of supports are non-extendable.

11. The foldable grill of claim 9, wherein said pair of supports are reversibly extendable.

12. The foldable grill of claim 1, wherein in each of said first and second grill portions:
(i) said compartment is adapted to hold combustible fuel; and
(ii) said grate adapted for use as a grilling surface.

13. The foldable grill of claim 12, wherein said compartment includes a plurality of ventilation ports, vents or slots, disposed in a lower part of at least one sidewall of said compartment.

14. The foldable grill of claim 13, wherein one or more of said ventilation ports, vents or slots are adapted to be covered, partially covered and completely uncovered.

15. The foldable grill of claim 12, wherein each of said gill portions further includes:
(iii) a grill net, said grill net being disposed between said grate and a bottom internal surface of said compartment and having a solid planar shape with ventilation holes formed therein, adapted such that ash filters down from said combustible fuel above said grill net to below said grill net and air passes through from below said grill net to said combustible fuel above said grill net.

16. The foldable grill of claim 15, wherein each of said gill portions further includes:
(iv) a heating efficiency partition, said heating efficiency partition is a thin partition having a same size and shape as said grill net and disposed between said grill net and a bottom surface of said compartment, said heating efficiency partition adapted to be in place only when in said closed configuration.

* * * * *